United States Patent
Dirson et al.

(10) Patent No.: US 11,554,321 B2
(45) Date of Patent: Jan. 17, 2023

(54) CAPTURE AND BROADCAST PROCESS TO COORDINATE ORDERS PRODUCED BY TWO REMOTE CUSTOMERS ASSOCIATED WITH THE SAME COMPUTER SESSION

(71) Applicant: SHADOW, Paris (FR)

(72) Inventors: Yann Dirson, Nanterre (FR); Grégory Gelly, Paris (FR)

(73) Assignee: SHADOW, Paris (FR)

( * ) Notice: Subject to any disclaimer, the term of this patent is extended or adjusted under 35 U.S.C. 154(b) by 31 days.

(21) Appl. No.: 17/009,425

(22) Filed: Sep. 1, 2020

(65) Prior Publication Data
US 2021/0069587 A1  Mar. 11, 2021

(30) Foreign Application Priority Data
Sep. 5, 2019 (FR) ...................... 1909788

(51) Int. Cl.
*A63F 9/24* (2006.01)
*A63F 13/355* (2014.01)
*G06F 3/14* (2006.01)

(52) U.S. Cl.
CPC .......... *A63F 13/355* (2014.09); *G06F 3/1454* (2013.01)

(58) Field of Classification Search
CPC ........ A63F 13/34; A63F 13/358; A63F 13/77; A63F 13/833; A63F 2300/402; A63F 2300/5533; A63F 2300/5593; A63F 2300/63; A63F 2300/638; A63F 2300/8029; H04L 67/38
See application file for complete search history.

(56) References Cited

U.S. PATENT DOCUMENTS

| | | | |
|---|---|---|---|
| 8,069,258 B1 * | 11/2011 | Howell | H04L 65/80 709/230 |
| 10,967,259 B1 * | 4/2021 | Berg | A63F 13/352 |
| 2010/0017454 A1 | 1/2010 | Uto et al. | |
| 2010/0022302 A1 | 1/2010 | Iwakiri et al. | |
| 2011/0053686 A1 * | 3/2011 | Takahashi | H04L 67/38 463/29 |
| 2017/0228851 A1 | 8/2017 | Freund et al. | |
| 2019/0321725 A1 * | 10/2019 | Zimring | A63F 13/335 |
| 2020/0278758 A1 * | 9/2020 | McAllen | A63F 13/44 |

OTHER PUBLICATIONS

French Search Report for French Application No. 1909788 dated Mar. 18, 2020, 2 pages.

* cited by examiner

*Primary Examiner* — Lawrence S Galka
(74) *Attorney, Agent, or Firm* — TraskBritt

(57) ABSTRACT

A capture and distribution method for coordinating commands produced by input/output devices of a first and a second remote client associated with the same computer session running on a host computer, implements the following operations from the host computer: sending the same sequence of identifiable time marks to each remote client; receiving and temporarily storing the commands coming from the first and second remote clients for a storage duration, each command being associated with a coordination datum linking an instant at which the command was produced to a time mark; sequencing the commands received during the storage duration according to their associated coordination datum; and successively delivering the sequenced commands to the computer session.

10 Claims, 4 Drawing Sheets

[Fig. 1]
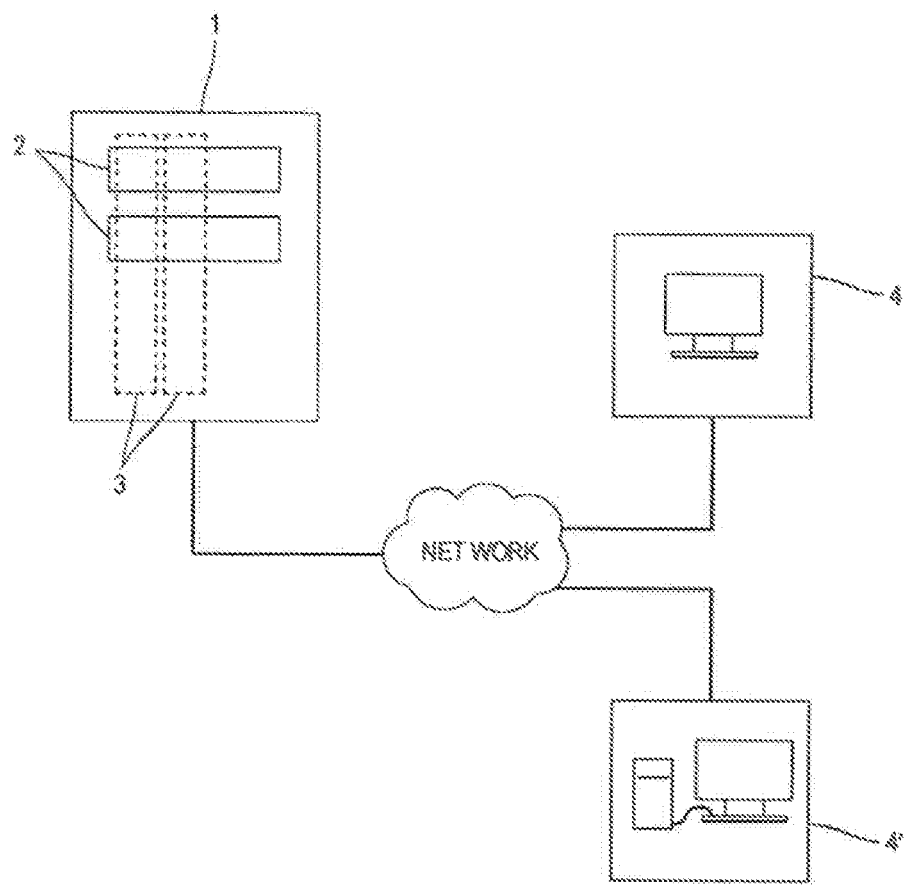

[Fig. 2]
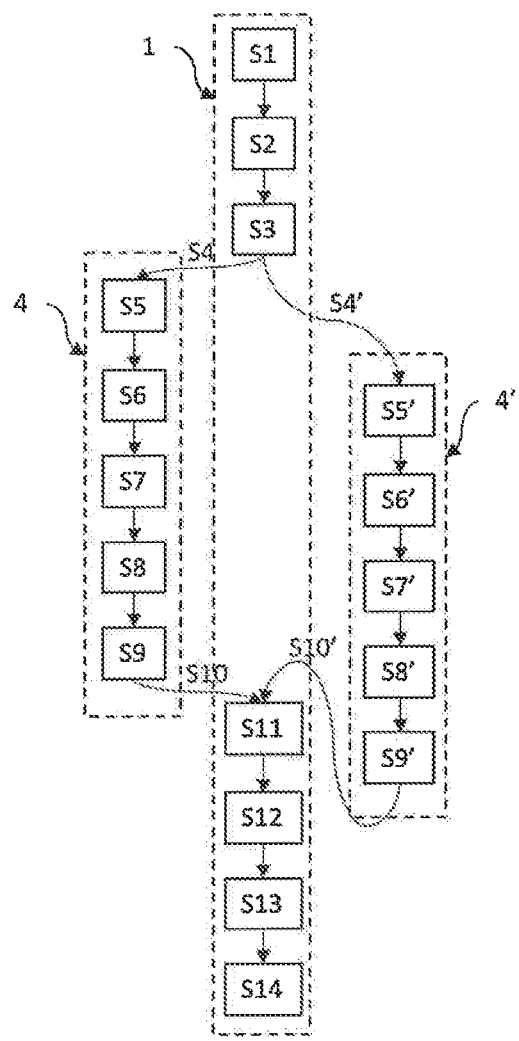

[Fig. 3]
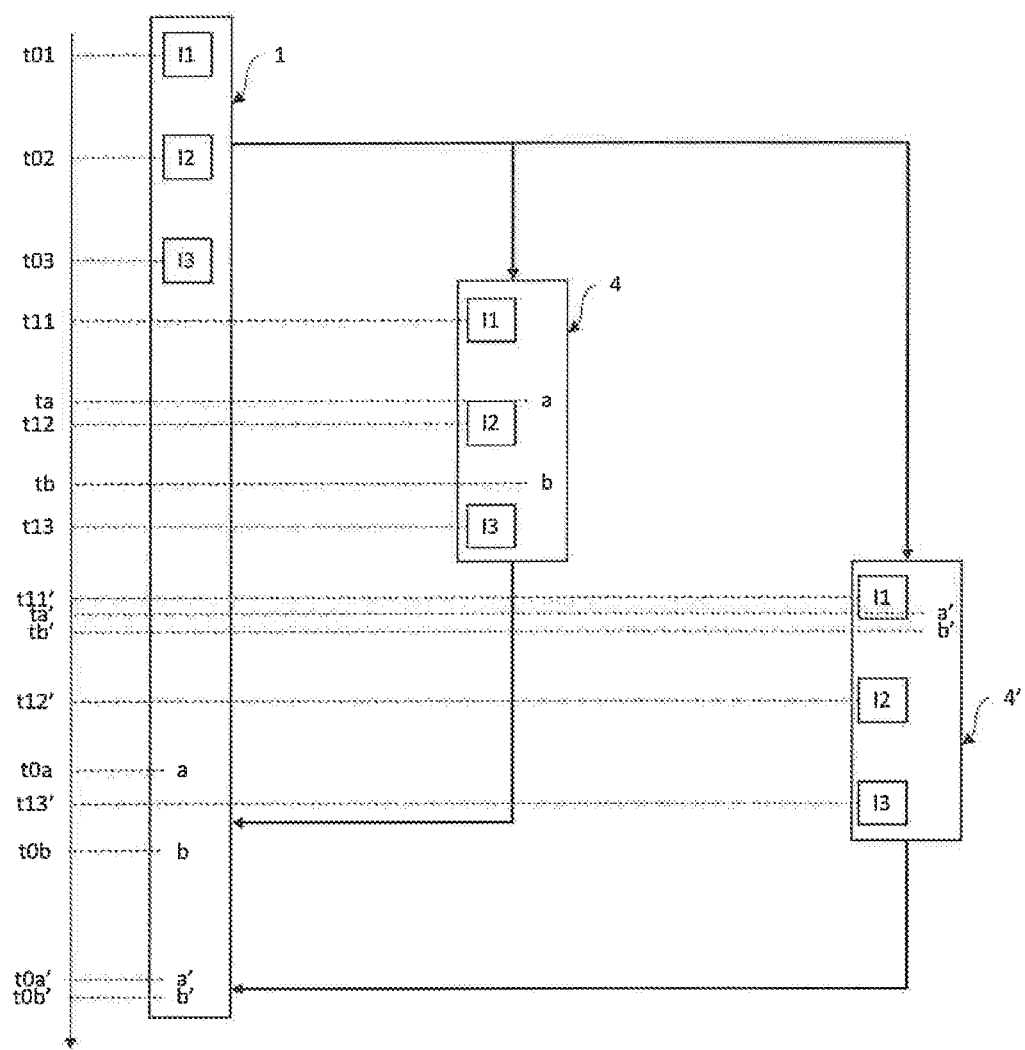

[Fig. 4]
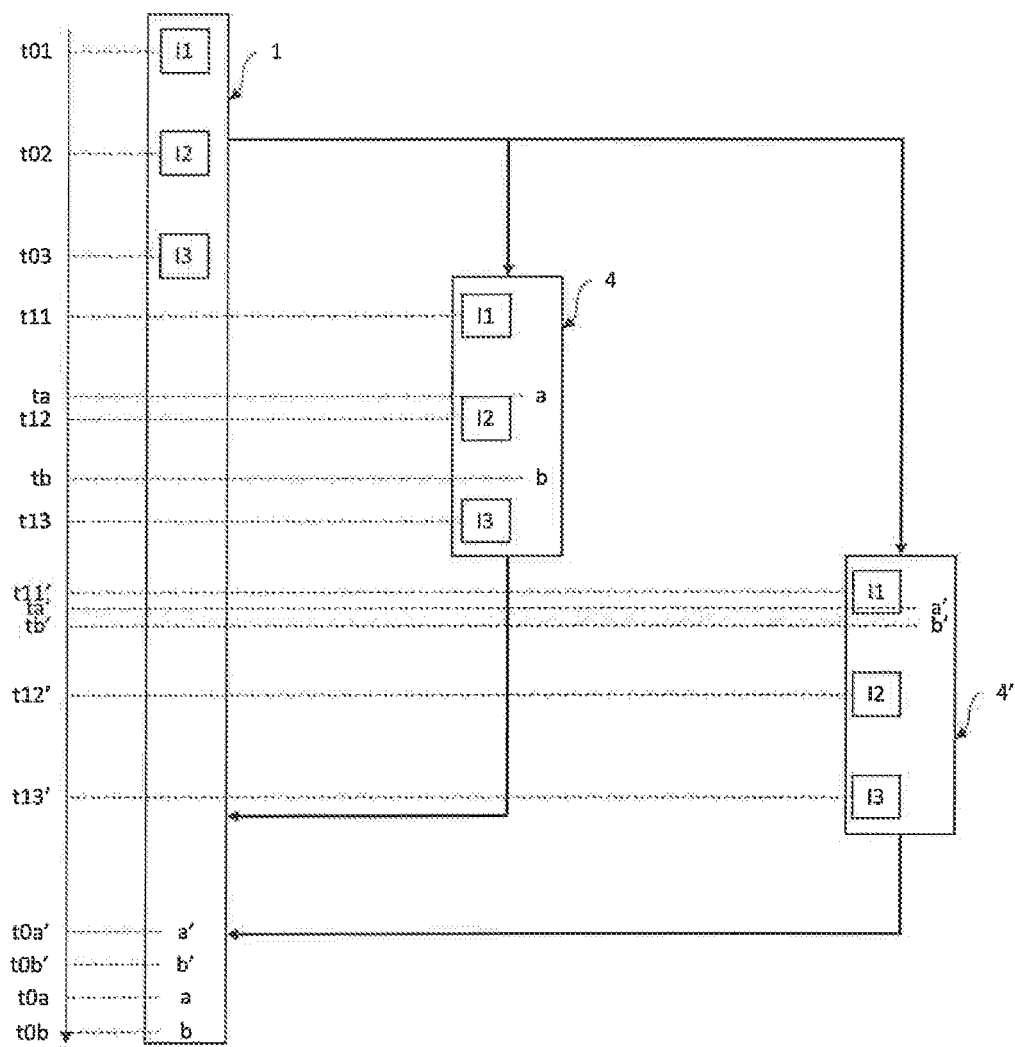

CAPTURE AND BROADCAST PROCESS TO COORDINATE ORDERS PRODUCED BY TWO REMOTE CUSTOMERS ASSOCIATED WITH THE SAME COMPUTER SESSION

PRIORITY CLAIM

This application claims the benefit of the filing date of French Patent Application Serial No. 1909788, filed Sep. 5, 2019, for "Capture and Distribution Method for Coordinating Commands Produced by Two Remote Clients Associated with the Same Computer Session," the contents of which are incorporated herein in their entirety.

TECHNICAL FIELD

The present disclosure relates to a capture and distribution method for processing commands produced by input/output devices of at least two remote clients associated with the same computer session running on a host computer. The present disclosure also relates to an operating method for processing these commands.

The present disclosure finds particular application in the field of network video games when a plurality of participants (users of remote clients) receive the same session information and wish to interact simultaneously with the session, and more particularly with the game application running there.

BACKGROUND

Document US2017228851 describes a configuration of a computer system of the cloud computing type in which the interface devices (screen, keyboard, controller, etc.) are at a distance from the processing and storage part of the computer session.

The interface devices are located in close proximity to the user and form a remote client. The processing and storage components that make up the host computer are located in a separate hosting location that is generally far apart from the remote client.

The user computer session runs on the host computer, and the host computer and the remote client respectively exchange session information and command data through a computer network, for example, the internet network to which they are both connected. This session information can thus include images and sounds that are intended to be reproduced on the remote client side, as well as command information, such as instructions issued from the host computer, which are intended to be communicated to the remote client, which, in turn, shares data produced by the input/output devices such as display, sound, and command data. In this way, the presence of a high-performance physical computer is emulated for the user without the need to directly own or have access to such equipment.

Certain computer applications require or can benefit from the ability on the part of a user to share a computer session with at least one other participant. For example, this may involve sharing the images produced by the computer session and displaying them on the screen of the remote client with this other participant. It may also involve sharing or giving control of the session to this other participant, with whom they can interact by way of their keyboard and mouse, for example.

This is particularly the case in online games where a group of players may wish to share their respective screens with each other in order to have a greater overview of the environment in which they are playing. This may also be the case in the field of remote education, where a teacher may wish to have access to the images displayed on his student's screen and possibly take control of the session in order to guide or correct him, for example.

Regardless of the application justifying the need for sharing of the information of a computer session, a plurality of remote clients may interact with the same computer session at the same time by sending commands to the host computer. In this situation, the host computer receives the commands sent by each remote client (cursor movement, mouse click, etc.) and decodes them and injects them into the session according to their order of arrival so that they can be processed by the application(s) being hosted in this session.

Every remote client suffers from a latency, a delay in communication with the host computer, that depends on a number of factors, notably on the quality of internet network, and therefore generally differs from that of another remote client. Consequently, the session information sent by the host computer to the clients of the same computer session is not received at the same instant by these clients in an absolute time frame.

This difference in latency can lead to situations in which a command of a remote client that has reacted more quickly than another client to the appearance of session information (the displaying of a new screen image, for example) is received by the host computer, and hence processed by the session, later than that of the other client.

As an example, FIG. 3 shows a chronogram of information exchanges between a host computer and a first and a second remote client.

In this figure, three session information items, e.g., three successive screen images I1, I2, and I3, are produced by the computer session. These three session information items are sent by the host computer 1 to the remote clients 4 and 4' at times t01, t02, t03, respectively. The first remote client 4 receives the information I1, I2, I3 at times t11, t12, t13, respectively. The second remote client 4', whose latency is greater than that of the first remote client 4, receives this information I1, I2, I3 at times t11', t12', t13', respectively, where t11'>t11, t12'>t12, and t13'>t13. Here, since the second remote client 4' is suffering from very high latency, it receives the first piece of information I1 after the first client 4 has received the third piece of information I3.

The user of the remote client 4, upon receiving the first piece of information I1, issues two instructions by means of the input/output devices of the first remote client 4, two successive mouse clicks, for example, which are designated as a and b in FIG. 3 and carried out at times ta and tb, respectively. Likewise, the user of the second remote client 4', upon receiving the first piece of information I1, performs two instructions by means of the input/output devices of the second remote client 4', which are designated as a' and b' and carried out at times ta' and tb', respectively.

In this illustration, the first remote client 4 issues the first instruction a between the reception of the information I1 and I2 and issues the second instruction between the reception of the information I2 and I3. The second remote client 4', more reactive, issues the two instructions between the reception of the information I1 and I2. More particularly, it issues the two instructions a', b' more quickly than the first instruction a of the first remote client 4 after receiving the first piece of information I1.

Each of the instructions, constituting command data, is supplied by each remote client 4, 4' to the host computer 1, which receives these data and supplies them to the computer session. The instants at which the instructions a, b, a', b' are received by the host computer 1 are denoted t0a, t0b, t0a', t0b', respectively.

The host computer supplies the command data to the session in the order in which it arrives, and the computer session thus processes the commands in the order a, b, a', b'. This order does not reflect the actual reaction time of each remote client 4, 4' following receipt of a session information item. In particular, this order reflects the latency phenomena that can affect each client.

It is therefore understood that the variability of the latency can result in processing distortion when the host computer receives the commands supplied by the various clients. This processing distortion is likely to disrupt the proper use of the same computer session by a plurality of remote clients.

Document US20110053686 relates to a method for synchronizing game sequences among a plurality of network game devices. In the computer architecture of this document, each gaming device runs its own computer session. The aim of the document is to streamline the storage of gaming devices so that data received from other devices belonging to completed gaming sequences is not mistakenly stored or processed, and to synchronize the transition from one gaming sequence to the next for all gaming devices.

BRIEF SUMMARY

It is an object of the present disclosure to at least partially remedy the aforementioned problem. It relates more particularly to a capture and distribution method and to an operating method for coordinating and processing commands supplied by remote clients, thus enabling these commands to be coordinated despite the variability in latency that may affect the clients.

To achieve this object, the present disclosure proposes a capture and distribution method for processing commands produced by input/output devices of a first and of a second remote client associated with a single computer session running on a host computer, the capture and distribution method implementing the following operations from the host computer:
- sending the same sequence of identifiable time marks to each remote client;
- receiving and temporarily storing the commands coming from the first and second remote clients for a storage duration, each command being associated with a coordination datum linking an instant at which the command was produced to a time mark;
- sequencing the commands received during the storage duration according to their associated coordination datum; and
- successively delivering the sequenced commands to the computer session.

According to other advantageous and non-limiting features of the present disclosure, taken alone or in any technically practicable combination:
- each time mark is associated with a session information item that is sent simultaneously by the host computer to the remote clients;
- the session information includes display, sound, and/or command information;
- the display information is images of the computer session, with each time mark comprising an image number; and
- the storage duration is between 1 ms and 1 s.

The present disclosure also proposes a computer program containing instructions suitable for implementing the operations of the capture and distribution method when the method is executed in the host computer.

The present disclosure also proposes an operating method for processing a command produced by an input/output device of a remote client associated with a computer session running on a host computer, the operating method implementing the following operations:
- receiving a sequence of identifiable time marks provided by the host computer;
- creating coordination data linking an instant at which the command was produced to one of the time marks; and
- providing the command associated with the coordination datum to the host computer.

According to other advantageous and non-limiting features of the present disclosure, taken alone or in any technically practicable combination:
- the coordination datum comprises an identifier of the time mark associated with the coordination datum; and
- the coordination datum comprises a measurement of the time separating the instant at which the command was produced to the reception of the associated time mark.

The present disclosure also proposes a computer program containing instructions suitable for implementing the operations of the operating method when the method is executed in the remote client.

BRIEF DESCRIPTION OF THE DRAWINGS

Other features and advantages of the present disclosure will become apparent from the following detailed description of example embodiments of the present disclosure, which is provided with reference to the accompanying figures, wherein:

FIG. 1 shows a computer architecture that makes it possible to implement the capture and distribution method and the operating method according to the present disclosure.

FIG. 2 shows the successive operations of a capture and distribution method and of an operating method according to the present disclosure.

FIG. 3 shows a chronogram of the exchanges of information between a host computer and a first and a second remote client of the prior art.

FIG. 4 shows a chronogram of the exchanges of information between a host computer and a first and a second remote client implementing a capture and distribution method and an operating method according to the present disclosure.

DETAILED DESCRIPTION

IT Architecture

FIG. 1 shows a computer architecture implementing the capture and distribution method and the operating method according to the present disclosure.

This architecture includes a host computer 1 having a plurality of servers 2. The servers 2 are made up of high-performance components (CPU, memory, storage disk, graphics and network cards, etc.) so as to form a particularly efficient hardware platform for running applications that may require significant processing capacities, such as video games.

As is well known, the servers 2 can be configured to host one or more virtual machine(s) 3 at the same time as its/their operating system and its/their applications. Virtualization makes it possible to host a plurality of virtual machines 3 in each server 2 in order to provide a plurality of virtual environments that are totally isolated from each other. Each virtual environment has access to the hardware resources of the server (CPU, memory, storage means, graphics card, etc.) that enable a user computer session to be run there. Examples of noteworthy, well-known virtualization technologies include CITRIX® XenServer™ MICROSOFT® Hyper-V™, VMWARE® ESXi™, Oracle™ Virtual Box™, Quick Emulator™ under the GNU™ Open License (QEMU™), etc.

Each of the virtual machines 3 in the host computer 1 can be dedicated to a specific user. The users interact with their dedicated virtual machines 3 from remote clients 4, 4', each being connected to the host computer 1 via a network such as the internet. Since most, if not all, of the processing takes place at the host computer 1, remote clients 4, 4' can be kept very simple and can, for example, include a simple terminal, a network connector, and basic input/output devices (keyboard, mouse, etc.) as shown by way of example by the first remote client 4 in FIG. 1. According to another solution, it can be a standard personal computer with its own central unit, graphics card, and peripherals, or it can be a tablet or a smartphone as represented by the other remote client 4'. The computer devices 4, 4' that are in communication with the host computer 1 are not all necessarily associated with a virtual machine (and therefore do not constitute a remote client within the meaning of the present description). Some can be equipped with all of the necessary hardware and software resources so that all session processing is performed locally. It therefore does not benefit from the processing resources that are provided by the servers 2 of the host computer 1. Nevertheless, they can interact, i.e., exchange information, with user sessions running on the servers 2.

Each server 2 preferably hosts fewer than ten virtual machines 3 so as to provide sufficient computer resources, particularly hardware, to each virtual machine 3 in order to run high-performance applications with a sufficient level of service. Each virtual machine 3 is created when the client 4, 4' is connected to the host computer 1 and comprises a virtual central unit, a virtual main memory, as well as all the other necessary resources.

The virtual machine 3 comprises or has access to a graphics processing unit for preparing display data for the session. This graphics processing unit can include a simple hardware video card that is associated with the virtual machine 3. It can also be a virtual video card or a virtual graphics card that is fully emulated by the hardware resources of the server (and, in particular, by its and their processing unit(s) and/or its or their graphics card(s)), these resources being made available to the virtual machine 3 by the virtualization software layer (the hypervisor) running on the server 2. This graphics processing unit can also mix hardware elements and virtual elements.

Preferably, and according to a particular embodiment that ensures a high level of performance, the graphics processing unit corresponds to a high-performance physical graphics card that is associated with and entirely dedicated to a virtual machine.

Regardless of whether physical or virtual, the graphics processing unit associated with the virtual machine 3 has the function of preparing and supplying the display data for the computer session running on the virtual machine 3.

This processing unit further comprises at least one video encoder that is capable of forming a video stream. As a reminder, the function of a video encoder is to process display information, supplied as input, in order to prepare a compressed video stream and to provide same as output. For example, it can be an encoder implementing the H.264 or H.265 standard which, as is inherently well known, is responsible for encoding the images into display data, grouping the data into data slices, structuring the slices into slice segments, and encapsulating the slice segments in separate transport units (known as "NAL units"), which make it possible to adapt the size of these transport units as a function of the transport mechanism that is selected. Such an encoder is generally configured such that the video stream that it prepares has a bit rate that is not greater than a maximum bit rate, which can be chosen. In order to limit the bit rate of the video stream to the maximum bit rate, the encoder may have to degrade the quality of the images forming the compressed video stream. Of course, the more the maximum bit rate is reduced, the more the perceived quality is reduced. As is inherently well known, compression is achieved by transmitting only the differences between the data of two successive images (or even of only a portion of these differences). A provision is made that complete images (known as "reference images") are inserted regularly into the video stream in order to enable the decoding of the compressed video stream to be initiated and to prevent any drifting of this decoding over time. The encoder can be configured to insert such a reference image on request and, more generally, it can be configured to adjust the compromise between the necessary encoding time and the quality of the video stream provided.

The graphics processing unit can comprise a plurality of encoders, i.e., at least one encoding unit, that can be used to provide at least two mutually independent video streams. In that case, it can be a single hardware encoder of a graphics card whose execution context can be changed in order to concurrently form at least two video streams that are distinct from one another. It can of course be a plurality of hardware encoders that are physically distinct from one another and respectively used to form a plurality of streams. Alternatively again, these encoders can be embodied purely as software. Whatever solution is adopted, it is advantageously possible to form a plurality of video streams by individually controlling the characteristics of each of these streams, particularly the bit rates thereof.

In general, each virtual machine 3 emulates a high-performance virtual personal computer that is associated with and controlled by at least one remote client 4, 4'. Each virtual machine 3 thus constitutes, or is the equivalent of, a user session, and a large number of these user sessions can be executed on the servers 2 of the host computer 1. The computer architecture can include a plurality of host computers 1 that are linked together and can be located in geographically separated computer data centers.

In order to display the images of the user session on the terminal of a remote client 4, 4' associated therewith, the host computer 1 supplies the remote client 4, 4' with display information, sound information, and command information for the input/output devices that are installed at the remote site.

Conversely, the remote clients 4, 4' supply the host computer 1 with command data originating from the processing of the commands generated by the input/output devices that are located at the remote site (keyboard, mouse), and possibly with other forms of data such as display and sound data provided by a USB device or integrated into a camera or microphone of the remote client 4, 4', or network devices, at the remote client, such as printers, etc.

In the present description, "session information" will denote any and all information sent by the host computer 1 to the remote clients 4, 4'. In particular, the session information comprises display, sound, or command information.

On the side of the host computer 1, a program for capture and distributing session information runs in the background in each computer session. The capture and distribution program implements operations that are aimed at collecting display, sound, and command information prepared by the computer session, encoding this data to limit the use of network bandwidth, and transmitting them to the remote client 4, 4'. The capture and distribution program also receives and decodes the commands communicated by the remote client 4, 4', exploits them, or supplies them to the user session so that they can be processed and exploited in a conventional manner.

The remote clients 4, 4', for their part, are provided with the appropriate hardware and/or software resources to decode the information communicated by the capture and distribution program so that they can be used on the client side. These resources are also used to prepare commands generated by the remote client and transmit them to host computer 1. In addition to the data coming from the interface devices of the remote client (keyboard, mouse, etc.), the commands can include additional information, such as the data rate information received from the host computer, making it possible to characterize the quality of the computer connection with this computer. The reception and processing of session information, as well as the processing and delivery of commands, are implemented by an operating program running at the remote client 4, 4'.

A plurality of remote clients, e.g., a first remote client 4 and a second remote client 4', can be associated with one and the same session. In this case, the capture and distribution program can send the session information simultaneously to the two remote clients 4, 4', for example by means of the plurality of encoders described above. In the other direction, each remote client 4, 4' supplies the command data produced by its input/output devices to the capture and distribution program, which processes them in order to supply them to the computer session.

Capture and Distribution and Operating Methods

FIG. 2 shows the successive operations of a capture and distribution method and of an operating method according to the present disclosure.

In this example, a first and a second remote client 4, 4' are associated with the same computer session running on the host computer 1. The capture and distribution method and the operating method are respectively implemented by the capture and distribution program running on the host computer 1 and by the operating program running on each remote client 4, 4'.

The capture and distribution method comprises a step S1 of processing the session information produced by the computer session. As explained above, the session information, in particular the display data corresponding to the screen images of the computer session and the sound data, can be prepared and supplied by a graphics processing unit associated with the virtual machine 3 in which the session is running. The display and sound data are supplied to at least one encoder, which can prepare them in the form of a video stream, for example in H.264 format, and an audio stream as has been described previously in greater detail.

The capture and distribution method also comprises a step S3 of preparing a session stream. In the present description, the expression "preparation of a session stream" is understood as referring to the formatting of the previously encoded session information in order to enable it to be transmitted through the network. In particular, this preparation can comprise the encapsulation of the NAL units into network layer packets, enabling information to be routed through the network.

A method according to the present disclosure comprises a step S2 of preparing identifiable time marks. The term "identifiable" is understood to mean that each time mark is associated with an identifier that makes it possible to distinguish it from the other time marks.

Time marks can be associated with session information. The step of preparing the time marks can be carried out following one of the preceding step, in which case a time mark is associated with each information packet, or before these steps are carried out, in which case a time mark is associated with session information, whereupon the whole is encapsulated in information packets and then network layer packets. The association of the session information with time marks can thus be performed at the moment in which the information is compressed by the encoder, at the level of the NAL units, or during the preparation thereof in the form of a session stream.

Advantageously, in the case in which the session information is screen images of the computer session, it is possible to associate a time mark with each image, each time mark then being able to comprise an image number to enable its identification. In this case, at the end of step S3 of preparing the session stream, each packet constituting the session stream comprises a packet number in its header, making it possible to order the packets corresponding to the same image, and an image number, all packets corresponding to the same image having the same image number.

The time marks can be prepared in a stream separate from the stream comprising the other session information, for example in order to enable circulation in a channel different from the session information. In this case, the time marks can consist of a counter value and be sent in sequence to the remote clients 4, 4', for example every 50 ms. It is not necessary for the time separating the sending of two successive time marks to be constant. The counter can be reset to zero regularly, for example when it reaches a maximum value of 256 (corresponding to a total sequence of approximately 13 seconds). This maximum value should be large enough that the duration of a total sequence (before resetting the counter) is several orders of magnitude greater than the average latency between the host computer and the remote clients. The separate stream that carries these time marks is composed of packets encapsulating the counter value.

Regardless of the manner in which time marks are integrated into the session stream to be sent in sequence to the remote clients, they are sent simultaneously to the plurality of remote clients 4, 4' associated with the same computer session. In order to achieve this, it is possible to prepare as many session streams as there are remote clients, for example by means of a plurality of encoders. Alternatively, it is also possible to use a multicast method, which involves preparing and sending a single session stream from the host computer 1, then in duplicating this stream, at the network level, to route the stream to all of the remote clients 4, 4' associated with the computer session.

Whatever method is used, the capture and distribution program sends the session stream to all of the remote clients 4, 4' in steps S4, S4'. In particular, the capture and distribution program sends the same sequence of identifiable time marks to each remote client 4, 4'.

On the remote client side, the operating program of each remote client 4, 4' implements an operating method, which comprises, in a reception step S5, S5', the reception of the session information, including the time marks, provided by the host computer 1 in the form of the session stream. The operating program thus receives, particularly, a sequence of identifiable time marks.

This step S5, S5' of receiving information can occur at a different time for each remote client 4, 4' even if the information has been sent simultaneously from the host computer 1 to all of these remote clients 4, 4'. Such a variation is due primarily to the latency affecting the remote clients 4, 4' differently, the cause of which may be the difference in geographical distance between the remote clients 4, 4' and the host computer 1, or the variation in internet network quality, which can lead to an increase in the duration of the transmission of session streams.

Regardless of its cause, this time difference in the reception of information has the effect of shifting, in an absolute time base, the moment at which each remote client 4, 4' benefits from the session information. This offset will be necessarily maintained for all of the operations that are described in the remainder of the present description.

In a step S6, S6' of processing the session information received, the operating program that is running on each remote client 4, 4' decodes and processes the received session stream. For example, the operating program can process a video stream in order to display it on a screen of the remote client 4, 4', or to emit a sound by means of a sound output device, such as a loudspeaker that is present at the remote client 4, 4'.

After the displaying or transmission of the session information, the user of the remote client 4, 4' can be led to interact by means of the input/output devices of the remote client, for example through a movement or a mouse click, or by entering a character or character string. Whatever the nature of the interaction, the input/output device of the remote client 4, 4' produces a command at a command production instant.

This command is captured by the operating program running on the remote client 4, 4', which can process the command data constituting this command during a processing step S7, S7' by arranging them as sequences, for example, e.g., by incorporating the last 10 or 20 command data that have been captured.

Regardless of the processing method used by the operating program, the latter implements a step S8, S8' of creating a coordination datum linking the instant at which the command was produced to one of the time marks of the sequence of time marks.

This step involves temporally locating the command produced by the input/output device of the remote client 4, 4' in the relative time base established by the time marks. This relative time base makes it possible to identify the instant at which the command was produced by each remote client not in relation to an absolute date and time, but rather in relation to an advantageously selected instant of reference.

To perform this identification, the coordination datum can include an identifier of the time mark associated with the command datum. This may be the image number associated with the time mark, for example.

Advantageously, the coordination datum can also include a measurement of the time separating the instant at which the command was produced at the instant of reference, i.e., upon receipt of the associated time mark by the remote client 4, 4', for example. The instant of reference and the instant at which the command was produced can be determined by reference to a local clock of the remote client 4, 4', the time between the two instants being calculated by simply finding the difference between the two pieces of data provided.

The instant at which the command was produced can be optionally linked to the reception or to the processing by the remote client 4, 4' of the nearest preceding time mark, or of the closest time mark. In the latter case, the remote client 4, 4' can comprise a memory for temporarily storing the command data at least until the reception of the next time mark and then comparing the time separating the instant at which the command was produced from the reception of the previous and following time mark and selecting the shortest time for the association. As will be readily understood, it is possible to choose any other association.

In a case in which the time mark is associated with an image, it is expedient to choose the instant of reference when the information packets constituting the session stream are reconstituted as an image. This choice of starting point makes it possible not to consider the processing time of the session stream, which can vary from one remote client to another in the same way as the latency. Thus, for all remote clients 4, 4', a starting point is chosen that is not linked to the sending of session information by the host computer 1 but to the displaying of this information at the remote client 4, 4'.

When carried out for each remote client 4, 4', the linking makes it possible, in particular, to know the reaction time of the user of each remote client 4, 4' relative to the reception of the same session information and not only relative to the transmission of the information by the host computer 1. Consequently, this makes it possible to disregard the latency time existing between the transmission and the reception of the session information and to consider only the reaction time of a user after an image is displayed, for example.

Regardless of the method that is used to generate the coordination datum, the operating method can also comprise a step S9, S9' for encoding the command associated with the coordination datum. This encoding step can conventionally comprise encapsulation thereof into command data packets and preparation of a command data stream by inherently known means.

Then, during a supply step S10, S10', the operating program then supplies the command associated with the coordination datum to the host computer 1.

Returning to the capture and distribution method, the capture and distribution program implements a reception step S11 during which the commands associated with the coordination data coming from the first and second remote clients 4, 4' are collected. The capture and distribution program can also implement a conventional step S12 of decoding the command data stream, making it possible to use this data.

The capture and distribution method also includes the temporary storage of this command data following the reception of the command data coming from the various remote clients 4, 4'. This step consists in preserving the command data associated with the coordination data originating from all of the remote clients 4, 4' associated with the same computer session in the memory of the host computer 1 for a certain storage duration. The storage time can typically be between 1 ms and 1 second.

This storage makes it possible to preserve all of the commands for a limited period of time so as not to delay the processing of commands received.

The capture and distribution method then comprises a step S13 of sequencing the commands received during the storage duration as a function of the coordination data with which they are associated. It is then sufficient to classify the coordination data in chronological order with respect to the instants of reference or with respect to the corresponding numbers.

The capture and distribution program then successively supplies the sequenced commands to the computer session in a supply step S14 so that they are processed by the latter in the order in which they were produced by the various remote clients following receipt of the sequence of time marks.

Example

In comparison with the counterexample of FIG. 3 developed in the introduction to the present application, FIG. 4 shows a chronogram of the exchanges of information and data between a host computer and first and second remote clients 4, 4' that are implementing a capture and distribution method and an operating method according to the present disclosure.

In this example, the same session information I1, I2, I3 is produced by the computer session, sent by the host computer 1, and received by the first and second remote clients 4, 4' at the same times as before.

Likewise, each remote client 4, 4' reacts to the reception of this information with two successive instructions, a, b and a', b', at the same times as described with reference to FIG. 3.

However, unlike the situation described with reference to FIG. 3, the commands have been associated here with coordination data in keeping with the coordination and processing methods according to the present disclosure. For each of these data, the instant of reference, relating to the session information sent by the host computer 1, is the reception of the first session information item I1. The coordination data associated with the session information thus comprises a counter that counts down the time separating the instant of reference from the instruction of a command by a remote client 4, 4'. Only session information I1 was chosen as an instant of reference, but it would of course have been equally possible to choose the session information that was received immediately prior to the instruction as an instant of reference.

After receiving and processing the commands associated with the coordination data, the host computer sequences the received commands according to their associated coordination datum. In other words, the capture and distribution program classifies the times separating the instant of reference of the instruction of each command in ascending order.

As can be seen in FIG. 4, this scheduling according to the coordination data ultimately leads to the computer session processing the commands in the sequence a', b', a, b.

This sequence based on a relative time base makes it possible to more coherently reflect the reaction time of each remote client 4, 4' upon reception of session information independently of the latency affecting that client.

As will be readily understood, the present disclosure is not limited to the described embodiments, and it is possible to add variants thereto without departing from the scope of the present disclosure as defined by the claims.

Therefore, although an architecture comprising two remote clients has been presented, the number of clients is in no way limiting, and it is possible to provide an architecture comprising a much larger plurality of clients without altering the reasoning in any way.

The invention claimed is:

1. A capture and distribution method for coordinating commands produced by input/output devices of a first remote client and a second remote client associated with a same computer session running on a host computer, the capture and distribution method implementing the following operations from the host computer:
sending the same sequence of identifiable time marks to each remote client;
receiving and temporarily storing the commands coming from the first and second remote clients for a storage duration, each command being associated with a coordination datum linking an instant at which the command was produced to a time mark;
sequencing the commands received during the storage duration according to their associated coordination datum; and
successively supplying the sequenced commands to the computer session,
wherein each coordination datum comprises a measurement of a time between an instant at which one of the commands was produced and a time of reception of the associated time mark at one of the remote clients.

2. The method of claim 1, wherein each time mark is associated with session information sent simultaneously by the host computer to the first and second remote clients.

3. The method of claim 2, wherein the session information comprises display, sound, and/or command information.

4. The method of claim 3, wherein the display information is images of the computer session, with each time mark comprising an image number.

5. The method of claim 4, wherein the storage duration is between 1 ms and 1 s.

6. A non-transitory computer-readable medium storing instructions thereon that, when executed by at least one processor of a host computer, cause the at least one processor to perform a capture and distribution method for coordinating commands produced by input/output devices of a first and a second remote client associated with a same computer session running on the host computer, the capture and distribution method implementing the following operations:
sending the same sequence of identifiable time marks to each remote client;
receiving and temporarily storing the commands coming from the first and second remote clients for a storage duration, each command being associated with a coordination datum linking an instant at which the command was produced to a time mark;
sequencing the commands received during the storage duration according to their associated coordination datum; and
successively supplying the sequenced commands to the computer session,
wherein each coordination datum comprises a measurement of a time between an instant at which one of the commands was produced and a time of reception of the associated time mark at one of the remote clients.

7. The method of claim 1, wherein the storage duration is between 1 ms and 1 s.

8. An operating method for processing a command produced by an input/output device of a remote client associated with a computer session running on a host computer, the operating method implementing the following operations:
receiving a sequence of identifiable time marks supplied by the host computer;
creating a coordination datum linking an instant at which the command was produced to one of the time marks; and
providing the command associated with the coordination datum to the host computer, wherein the coordination datum comprises a measurement of the time between the instant at which the command was produced and the reception of the associated time mark.

9. The method of claim 8, wherein the coordination datum comprises an identifier of the time mark associated with the coordination datum.

10. A computer program containing instructions suitable for implementing the operations of the operating method according to claim 8 when the method is executed in the remote client.

* * * * *